US005748380A

United States Patent [19]
Yanari

[11] Patent Number: 5,748,380
[45] Date of Patent: May 5, 1998

[54] EYEPIECE LENS WITH LONG EYE RELIEF

[75] Inventor: Mitsuhiro Yanari, Tokyo, Japan

[73] Assignee: Nikon Corporation, Tokyo, Japan

[21] Appl. No.: 717,397

[22] Filed: Sep. 20, 1996

[30] Foreign Application Priority Data

Sep. 21, 1995 [JP] Japan ........ 7-267848

[51] Int. Cl.[6] ........ G02B 25/00

[52] U.S. Cl. ........ 359/646; 359/643; 359/644; 359/645

[58] Field of Search ........ 359/643–646

[56] References Cited

U.S. PATENT DOCUMENTS

| | | | |
|---|---|---|---|
| 3,233,513 | 2/1966 | Wagner et al. | 359/644 |
| 3,352,620 | 11/1967 | Scidmore et al. | 359/644 |
| 3,384,434 | 5/1968 | Scidmore et al. | 359/644 |
| 4,286,844 | 9/1981 | Nagler | 359/644 |
| 4,497,546 | 2/1985 | Kobayashi | 359/644 |
| 4,747,675 | 5/1988 | Nagler | 359/643 |
| 5,579,167 | 11/1996 | Oomura et al. | 359/646 |
| 5,612,823 | 3/1997 | Koizumi | 359/643 |
| 5,638,213 | 6/1997 | Ueno | 359/643 |

FOREIGN PATENT DOCUMENTS

| | | |
|---|---|---|
| 4013798 A1 | 1/1991 | Germany . |
| 61-228411 | 10/1986 | Japan . |
| 6-109983 | 4/1994 | Japan . |
| 6-175047 | 6/1994 | Japan . |
| 7-225344 | 8/1995 | Japan . |

*Primary Examiner*—David C. Nelms
*Assistant Examiner*—Evelyn A. Lester
*Attorney, Agent, or Firm*—Klarquist Sparkman Campbell Leigh & Whinston, LLP

[57] ABSTRACT

An eyepiece lens is disclosed that corrects aberrations over a wide apparent field of view, and has a short overall length and sufficiently long eye relief (typically at least 150% of overall focal length F). The eyepiece lens comprises, in order from the objective lens side, first and second lens groups having negative and positive refractive power, respectively, with a field stop situated therebetween. The first lens group comprises a cemented negative lens including two lens elements cemented together. The second lens group comprises, in order from the objective lens side, a positive meniscus lens element having a concave surface oriented objectivewise; a cemented lens comprising two lens elements cemented together and in which the most objectivewise lens surface is a concave surface oriented objectivewise; and a lens subgroup having positive refractive power and comprising a positive meniscus lens element having a concave surface oriented eyewise. The eyepiece lens satisfies at least the conditions: $-4.5 \leqq F_1/F \leqq -2.0$, $1.0 < F_2/F \leqq 3.0$, and $2.5 \leqq D/F \leqq 5.0$, wherein F, $F_1$, and $F_2$ are the respective focal lengths of the eyepiece lens overall, the first lens group, and the second lens group $G_2$; and D is the axial air-space distance between the first and second lens groups.

10 Claims, 12 Drawing Sheets

E.P.
A
D
G1
L11
L12
1
2
3
G2
G21
G22
G23
L221
L222
L231
L232
4
5
6
7
8
9
10
11
12
R21a
R22a
R232b
FS

A
1
2
3
L11
L12
$G_1$
D
$R_{21a}$ (4)
5
FS
$G_{21}$
$R_{22a}$ (6)
L221
7
L222
8
$G_{22}$
$G_2$
$G_{23}$
9
L231
10
11
L232
$R_{232b}$ (12)
E.P.

E.P.
G2
G21
G22
G23
G1
L232
L231
L222
L221
L11
L12
L13
FS
D
A
R232b
(14)
R22a
(8)
R21a
(6)
1
2
3
4
5
7
9
10
11
12
13

EYEPIECE LENS WITH LONG EYE RELIEF

FIELD OF THE INVENTION

This invention pertains to eyepiece lenses used in telescopic lens systems, such as binoculars, or in microscopes.

BACKGROUND OF THE INVENTION

With respect to eyepiece lenses employed in telescopic lens systems and in microscopes, it is desirable for the distance between the eye point and the apex of the lens surface nearest the eye side (hereinafter referred to as the "eye relief") to be at least 80% of the focal length of the eyepiece lens to ensure that the entire field of view of the lens system can be easily visualized by the eye.

However, in general, the eye relief of an eyepiece lens decreases as the apparent field of view of the eyepiece lens is increased while also effectively suppressing aberrations at the perimeter of the apparent field of view. On the other hand, if the eye relief is increased (lengthened) while keeping the apparent field of view constant, then the lens diameter of the eyepiece lens increases, and aberrations at the perimeter of the apparent field of view, especially coma, astigmatism, lateral chromatic aberration, and distortion, consequently become markedly worse. In addition, even though the eye relief in conventional eyepiece lenses with short focal lengths is more than 80% of the focal length of the eyepiece lens, the eye relief is frequently insufficient for viewing.

In conventional eyepiece lenses comprising, in order from the objective lens side, a negative lens group, a field stop, and a positive lens group, the eye relief can be increased to 100% or more of the focal length of the eyepiece lens by means of the negative lens group. Using a negative lens group having strong negative refractive power can help decrease the Petzval's sum and effectively correct image curvature. Further with respect to such eyepiece lenses, it is beneficial that the ratio of the absolute value of the focal length of the negative lens group to the absolute value of the focal length of the positive lens group be close to 1:1 because this enables the Petzval's sum to be decreased and image curvature to be corrected.

However, when the focal-length ratio is close to 1:1, whereas increasing the focal length of the positive lens group is beneficial with respect to aberration correction and achieving satisfactory eye relief, it markedly increases the overall length of the eyepiece lens. In contrast, while decreasing the focal length of the positive lens group desirably decreases the overall length of the eyepiece lens, thus rendering the eyepiece lens more compact, aberration correction and eye relief are degraded. Especially in instances in which the negative lens group has a strong negative refractive power, pupil aberrations are difficult to effectively correct because the pupil magnification of the positive lens group is too great. In instances in which pupil aberration is insufficiently corrected, much distortion remains uncorrected and the object as viewed by the user through the eyepiece lens appears distorted. And, while such an eyepiece lens may not exhibit vignetting of the field of view at the position of the eye point, vignetting of the field of view can occur even if the eye is shifted only slightly away from the eye point. Furthermore, if the light flux on the eye side is narrow, the light flux from the entire field angle of the eyepiece lens may not enter the eye even if the eye is positioned at the eye point, causing partial vignetting of the field of view.

Thus, while it is necessary that the focal length of the positive lens group (on the eyepiece side) of the eyepiece lens be large in order to obtain a long eye relief, especially in eyepiece lenses with a short focal length, it is also necessary for the absolute value of the focal length of the negative lens group (on the objective lens side) to be large in order to achieve effective aberration correction; this, combined with the accompanying long axial distance between the positive and negative lens groups, undesirably yields an excessively long overall axial length of the eyepiece. The tendency for this kind of fault to appear becomes especially marked as the overall focal length of the eyepiece lens becomes smaller.

The eyepiece lenses disclosed in, e.g., Japan Laid-Open patent document no. SHO 56-85723 have a short overall length and a long eye relief of approximately 140% of the focal length of the eyepiece lens. However, those eyepiece lenses are inadequate for use as short focal-length eyepiece lenses. The eyepiece lenses disclosed in Japan Laid-Open patent document no. HEI 6-175047 have a sufficiently long eye relief. However, as the focal length of such an eyepiece lens is shortened, the overall axial length of the eyepiece lens becomes extremely long.

SUMMARY OF THE INVENTION

According to one aspect of the present invention, an eyepiece lens is provided for use with an objective lens. The eyepiece lens exhibits a short overall focal length, and effectively corrects various aberrations across a wide field of view. The eyepiece lens has an eye relief of at least 100%, preferably at least 150%, of the focal length of the eyepiece lens. Moreover, the eyepiece lens is compact and has a relatively short overall length.

Further according to a preferred embodiment, the eyepiece lens comprises, in order from the objective lens side, first and second lens groups with a field stop axially situated therebetween. The first lens group has a negative refractive power and a focal length F1. The second lens group has a positive refractive power and a focal length F2. The first lens group comprises a cemented negative lens including two lens elements cemented together. The second lens group comprises, in order from the objective lens side, a positive meniscus lens element having a concave surface oriented objectivewise, a cemented lens comprising two lens elements cemented together and having a most objectivewise lens surface that is a concave surface oriented objectivewise, and a lens subgroup having positive refractive power and comprising a meniscus lens element having a concave surface oriented eyewise. Furthermore, the eyepiece lens satisfies the following Conditional Expressions:

$$-4.5 \leq F_1/F \leq -2.0$$

$$1.0 < F_2/F \leq 3.0$$

$$2.5 \leq D/F \leq 5.0$$

wherein F is the overall focal length of the eyepiece lens and D is the axial air-space distance between the first and second lens groups.

DETAILED DESCRIPTION

As used herein, "objectivewise" refers to an orientation facing the objective lens with which the subject eyepiece lens is used, and the "objective lens side" of the eyepiece lens is the axial region that normally would be situated between the eyepiece lens and the objective lens. "Eyewise" refers to an orientation facing a user's eye, and the "eye side" of the eyepiece lens is the axial region that normally would be situated between the eyepiece lens and the user's eye. "E.P." means eye point. In the optical diagrams of FIGS. 1, 3, 5, 7, 9, and 11, the eye side is on the right, and the objective lens side is on the left.

Figure 1:
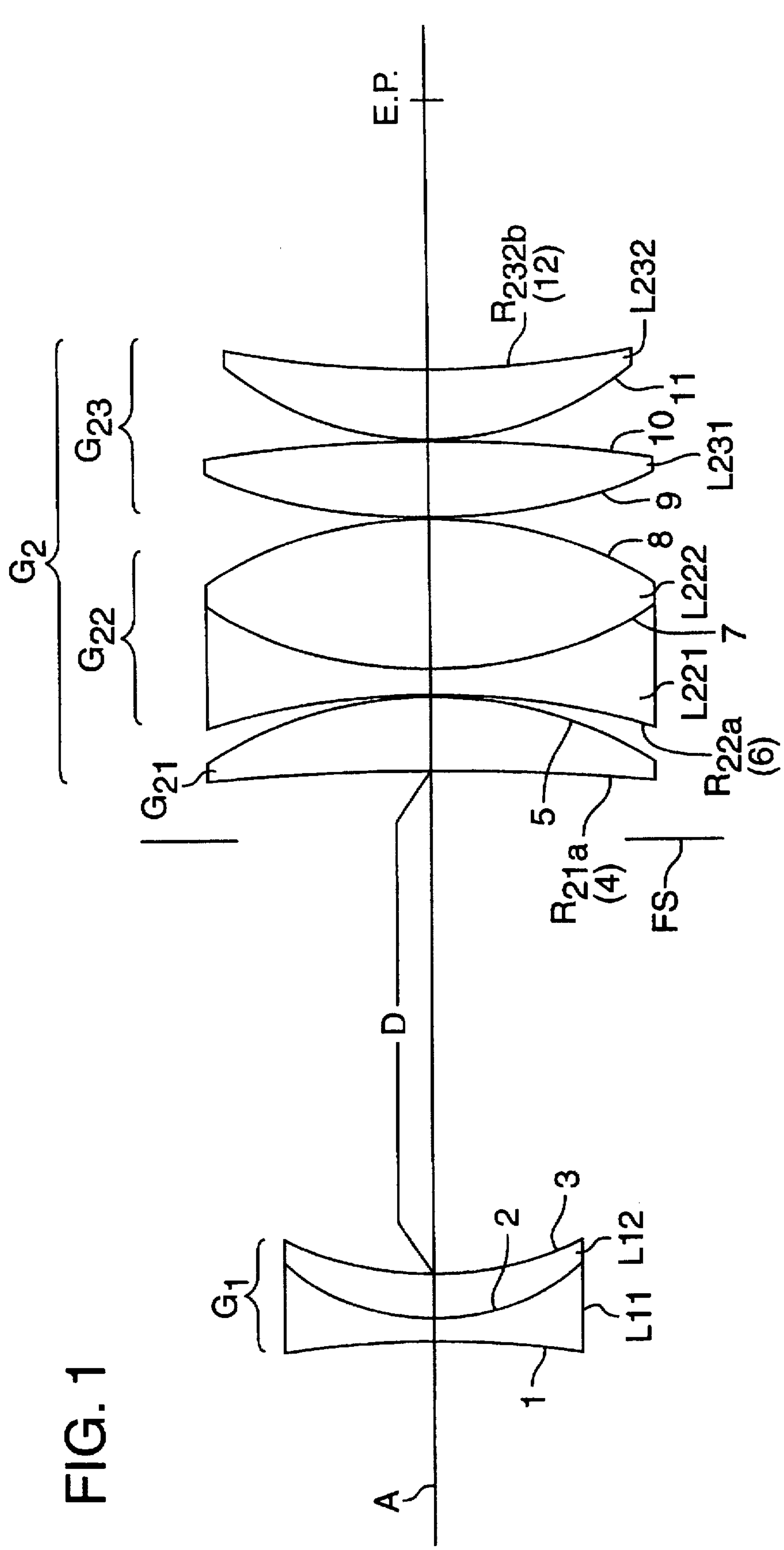
FIG. 1 is an optical diagram showing general features of eyepiece lenses according to the present invention as well as specific features of Example Embodiment 1.
Figure 2:
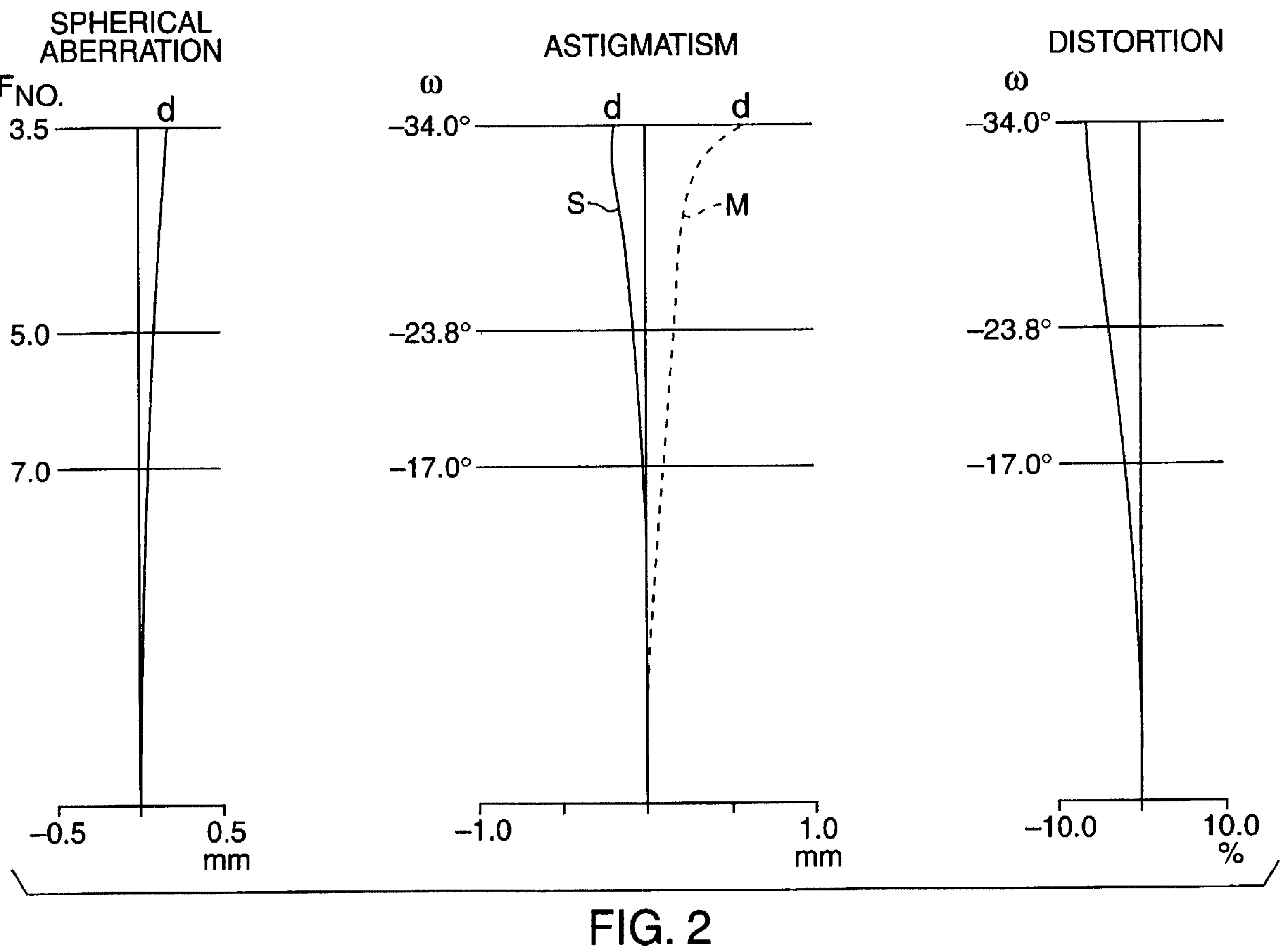
FIG. 2 shows plots for spherical aberration, astigmatism, and distortion exhibited by Example Embodiment 1.
Figure 3:
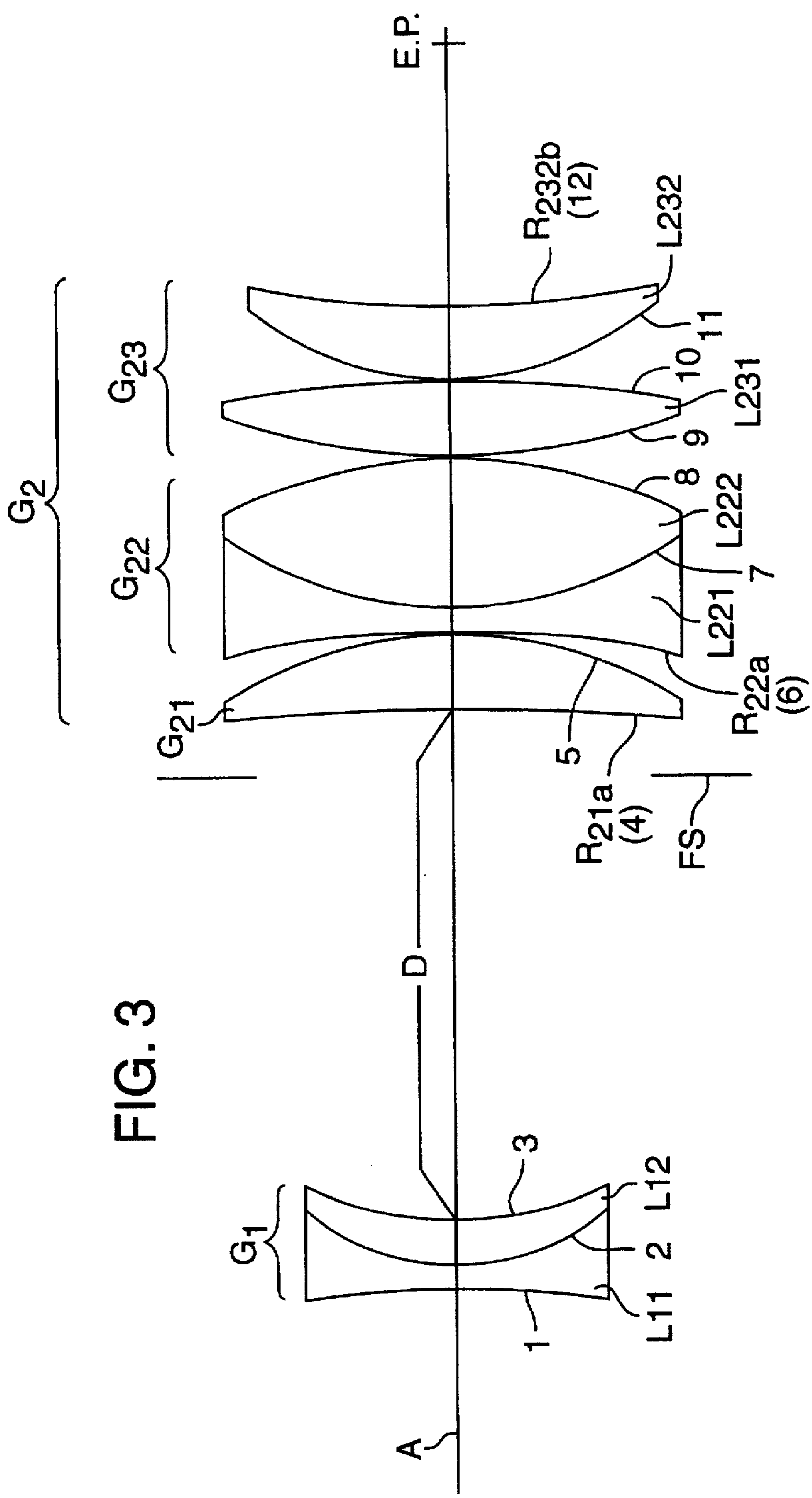
FIG. 3 is an optical diagram showing specific features of Example Embodiment 2.
Figure 4:
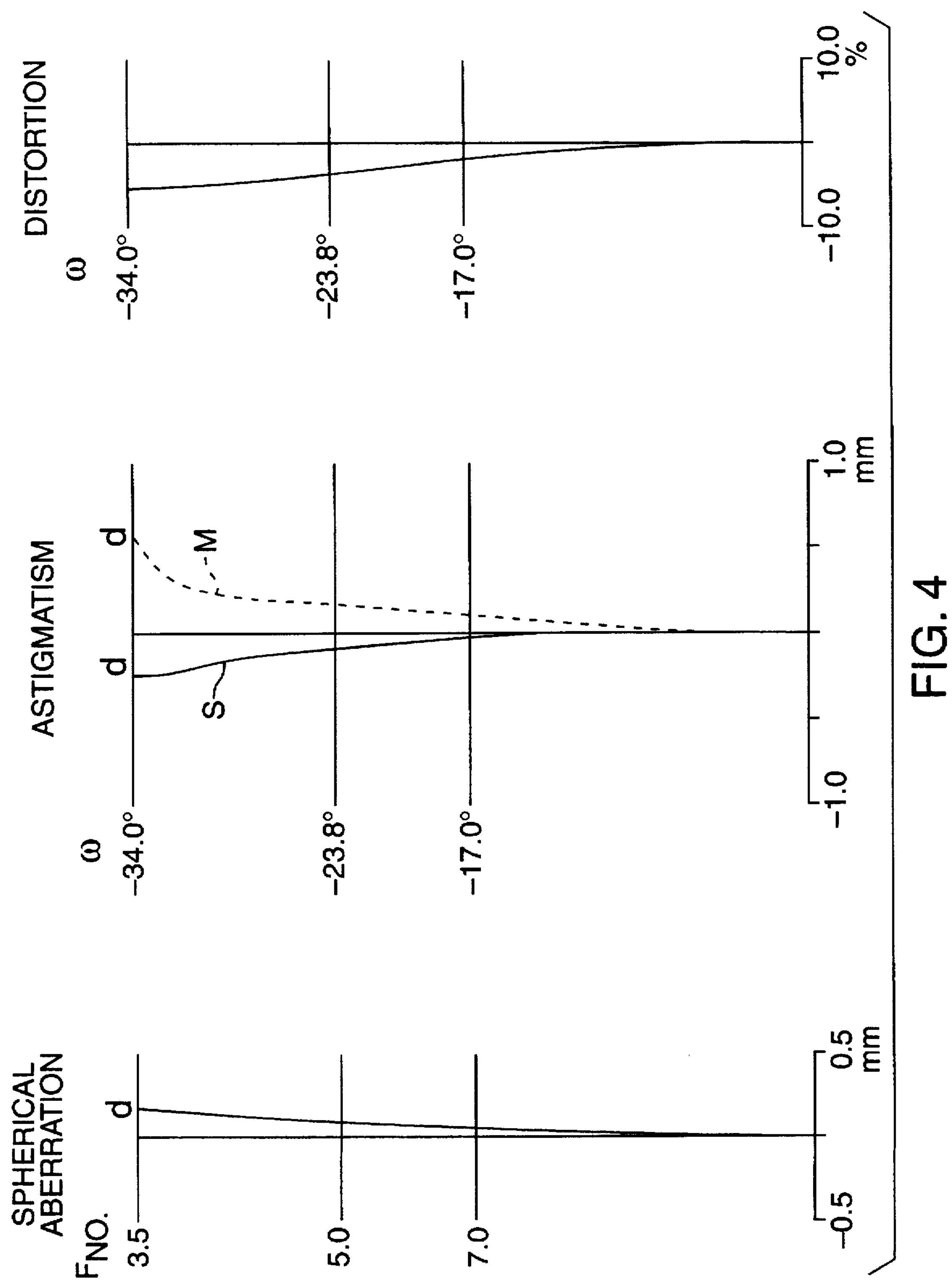
FIG. 4 shows plots for spherical aberration, astigmatism, and distortion exhibited by Example Embodiment 2.
Figure 5:
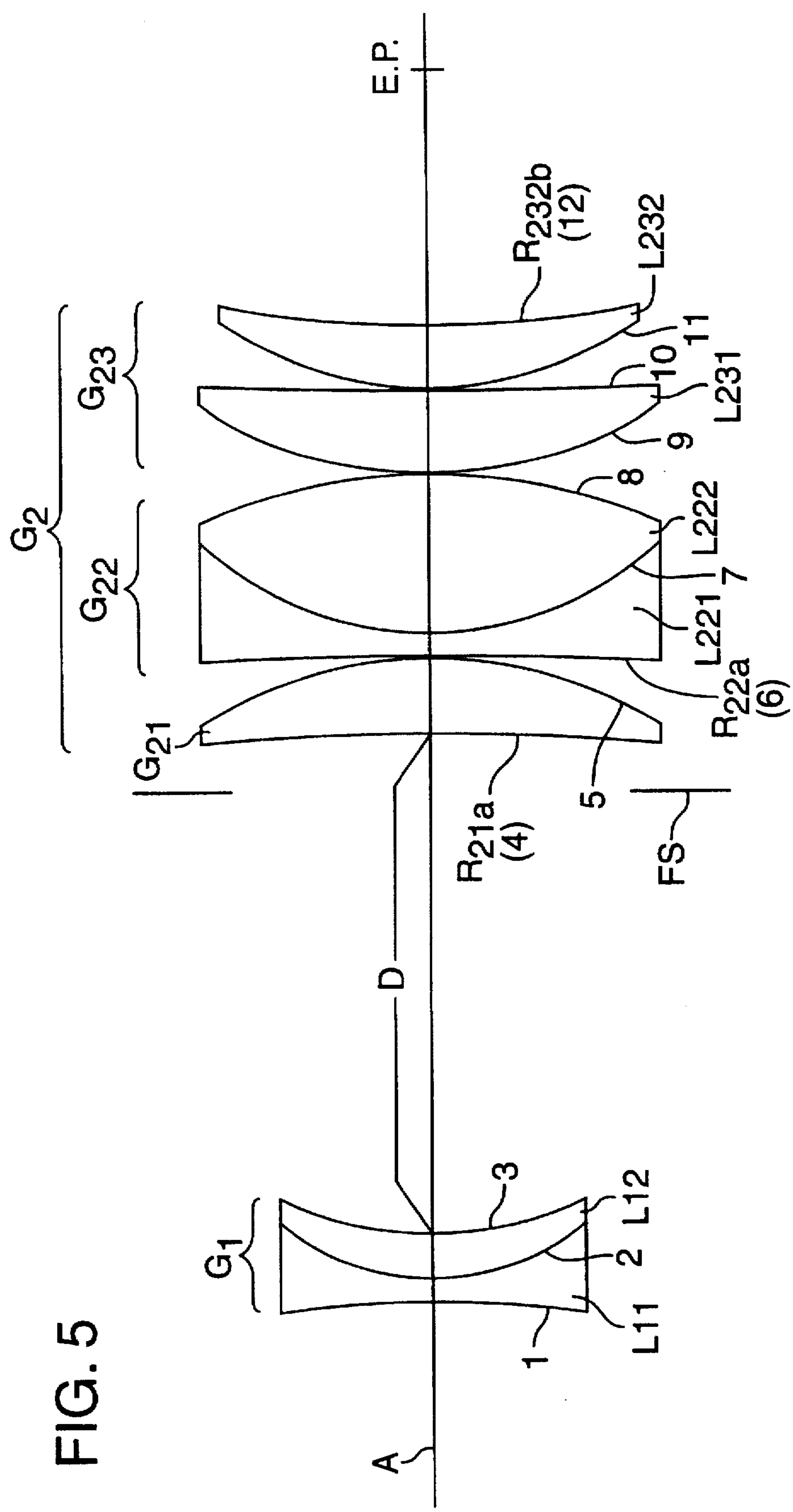
FIG. 5 is an optical diagram showing specific features of Example Embodiment 3.
Figure 6:
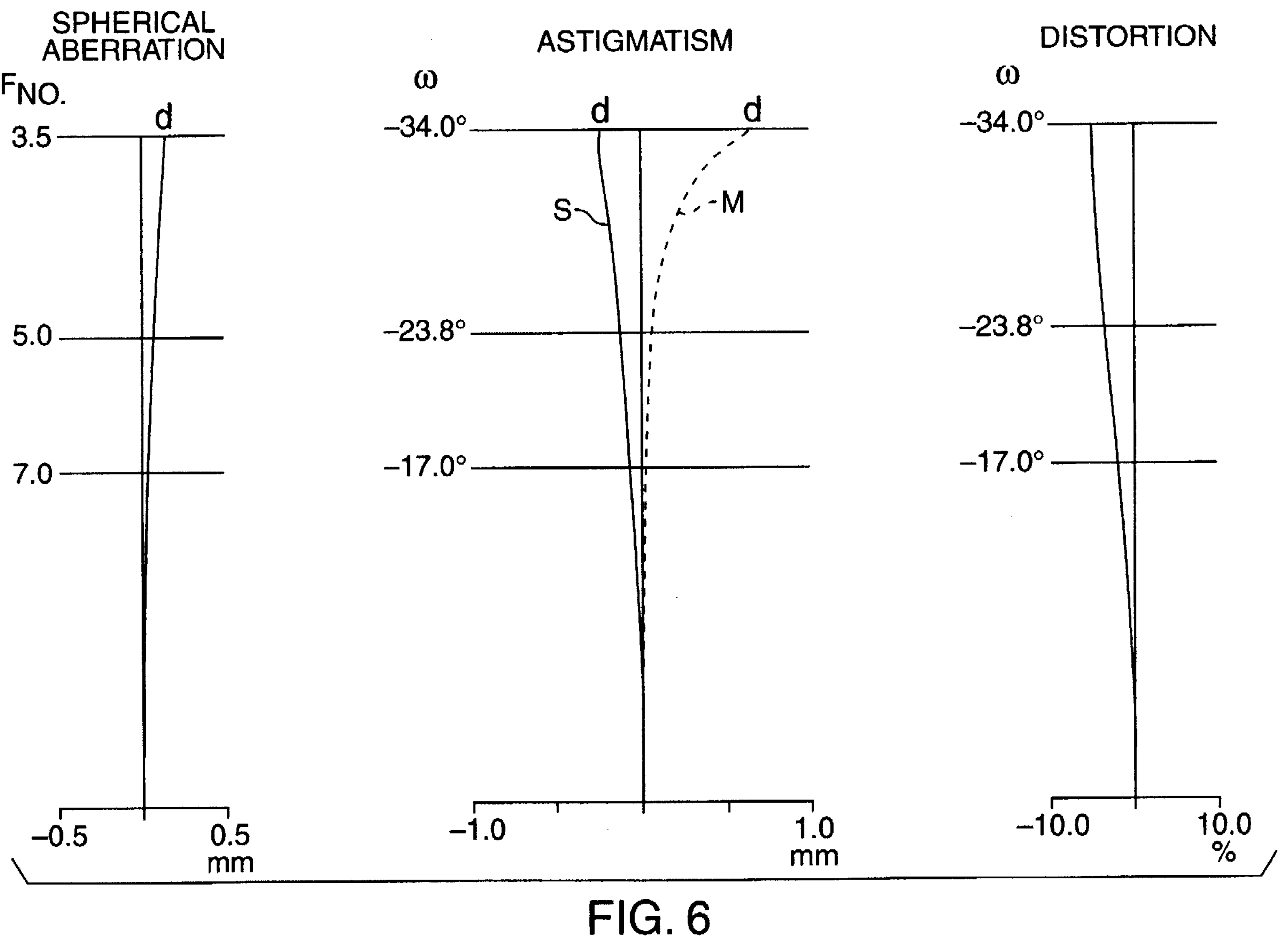
FIG. 6 shows plots for spherical aberration, astigmatism, and distortion exhibited by Example Embodiment 3.
Figure 7:
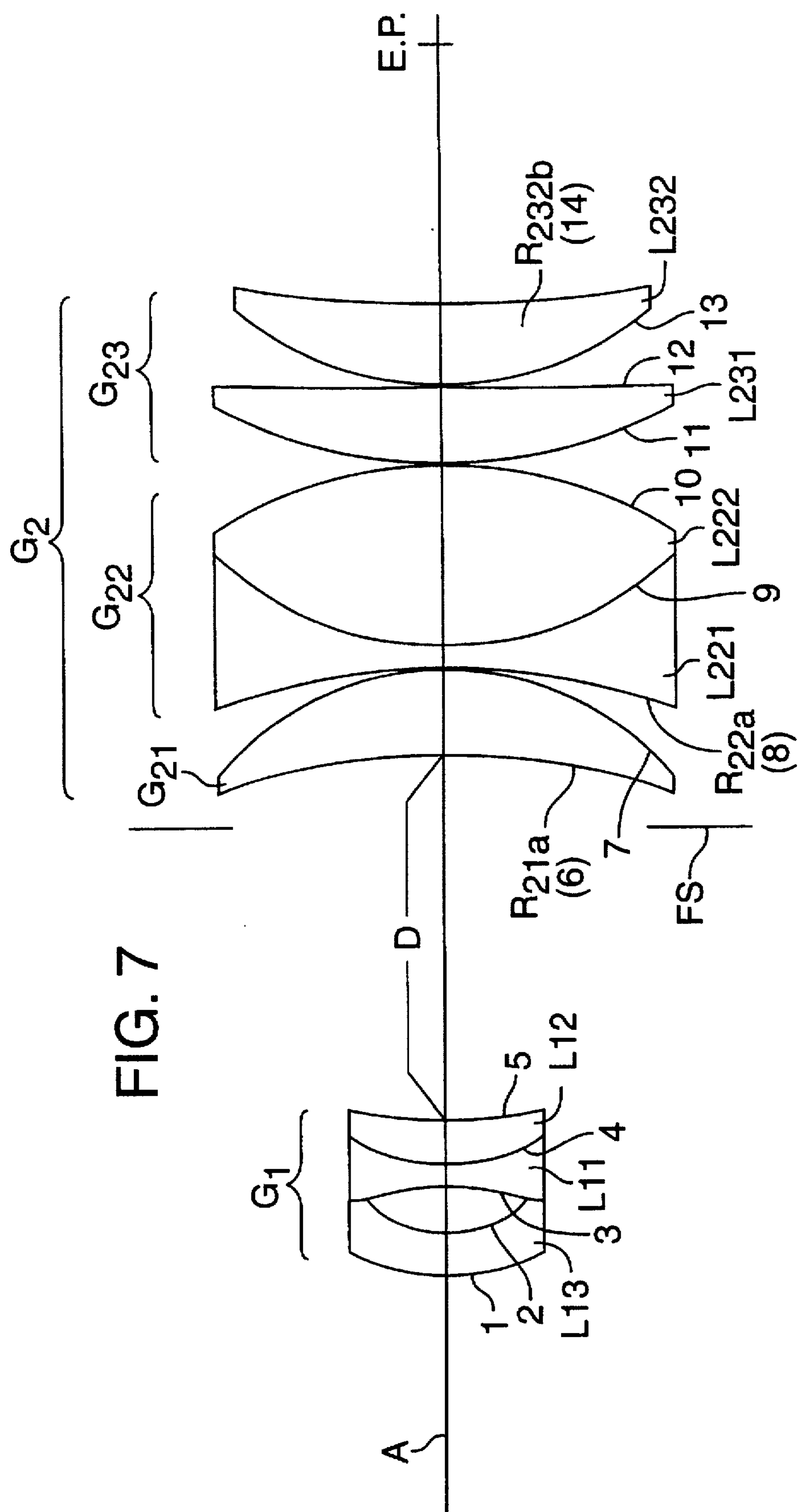
FIG. 7 is an optical diagram showing specific features of Example Embodiment 4.
Figure 8:
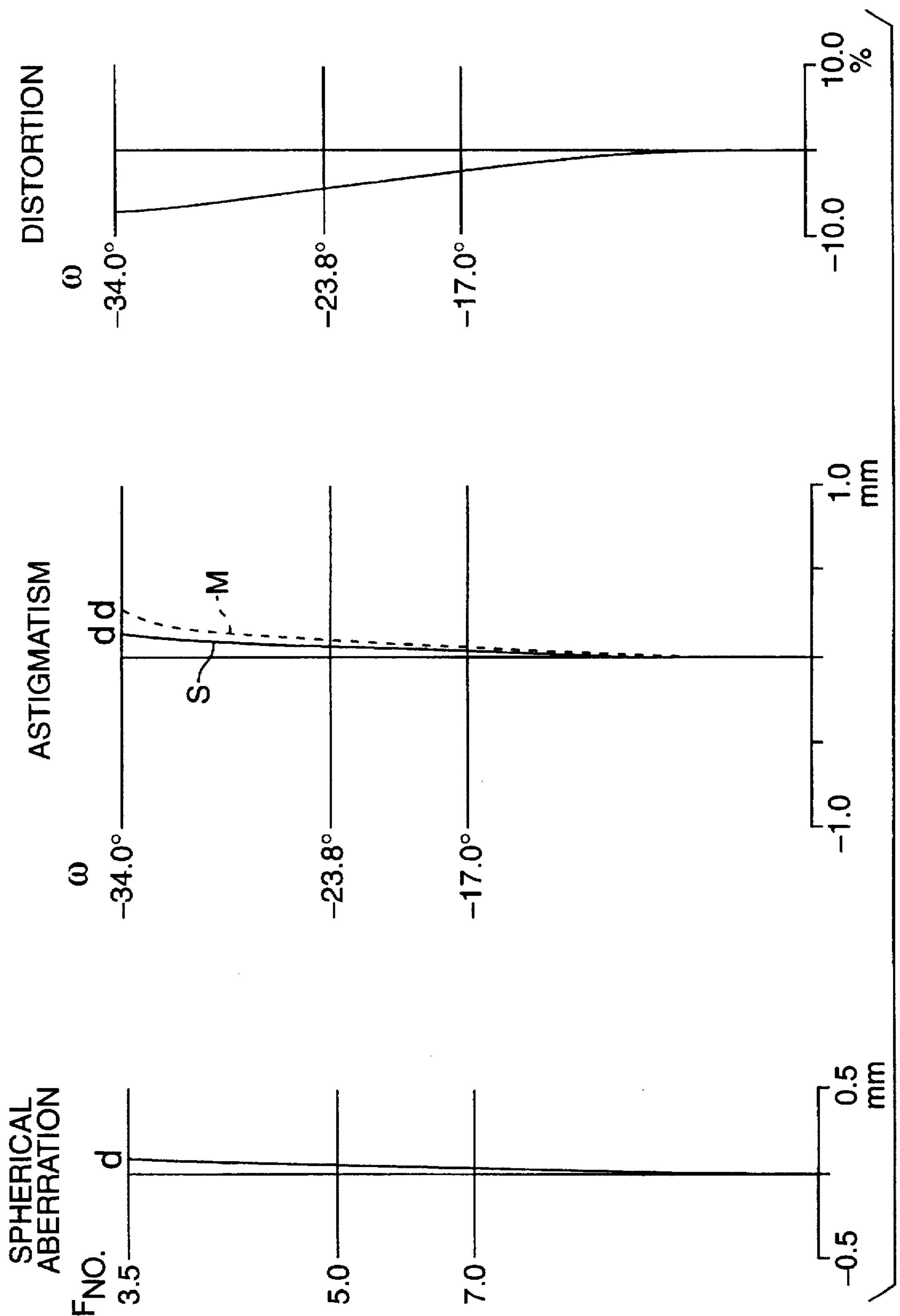
FIG. 8 shows plots for spherical aberration, astigmatism, and distortion exhibited by Example Embodiment 4.
Figure 9:
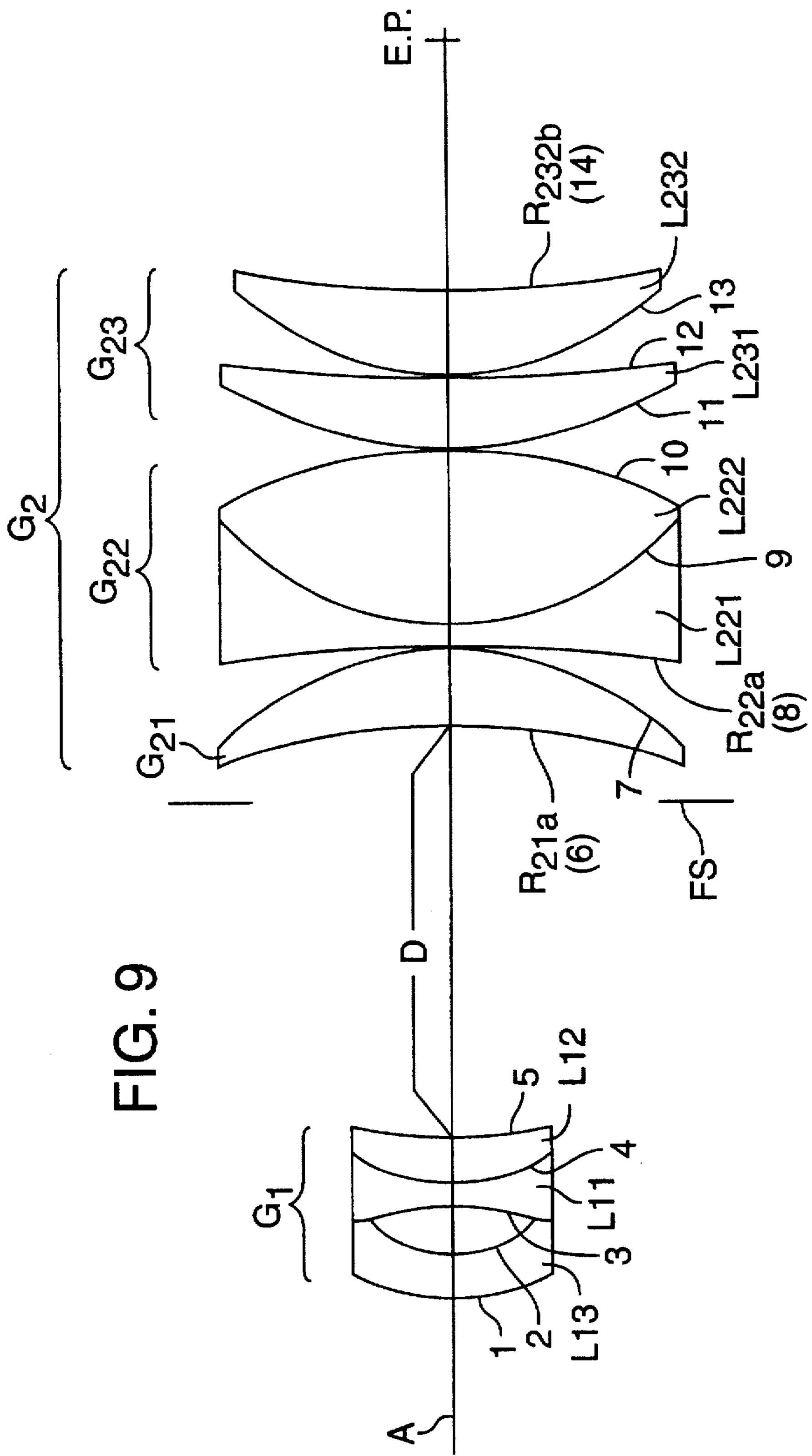
FIG. 9 is an optical diagram showing specific features of Example Embodiment 5.
Figure 10:
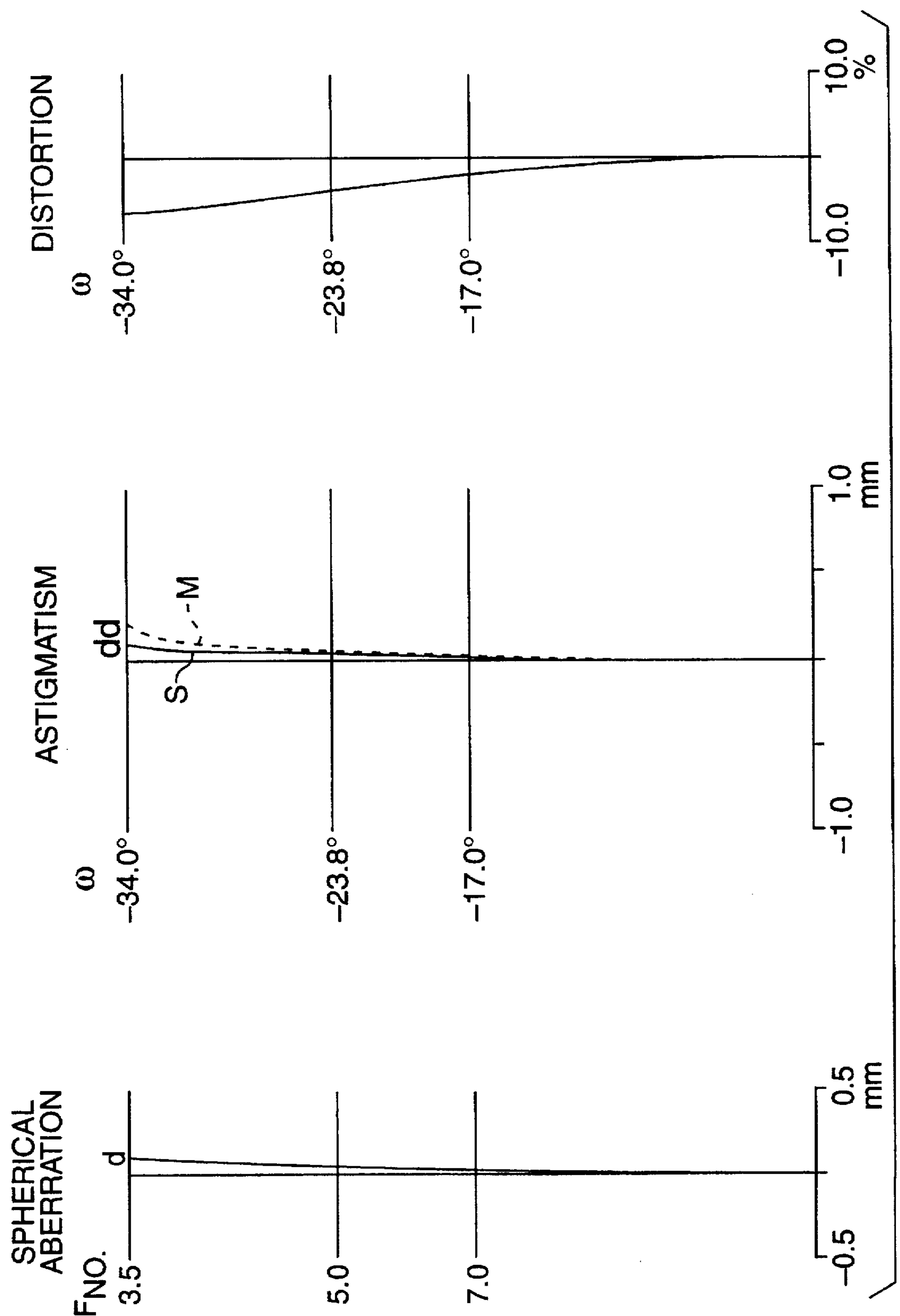
FIG. 10 shows plots for spherical aberration, astigmatism, and distortion exhibited by Example Embodiment 5.
Figure 11:
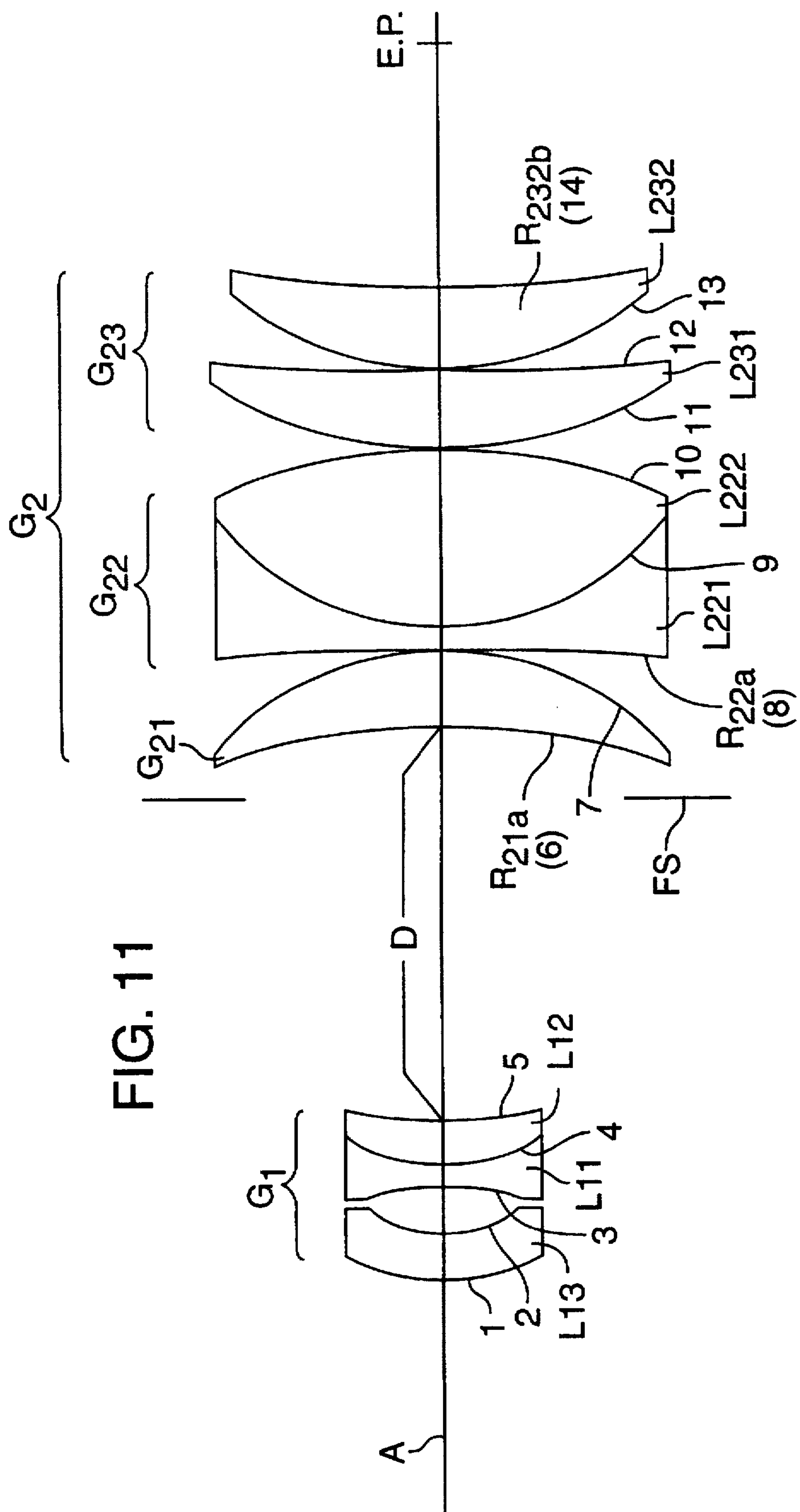
FIG. 11 is an optical diagram showing specific features of Example Embodiment 6.
Figure 12:
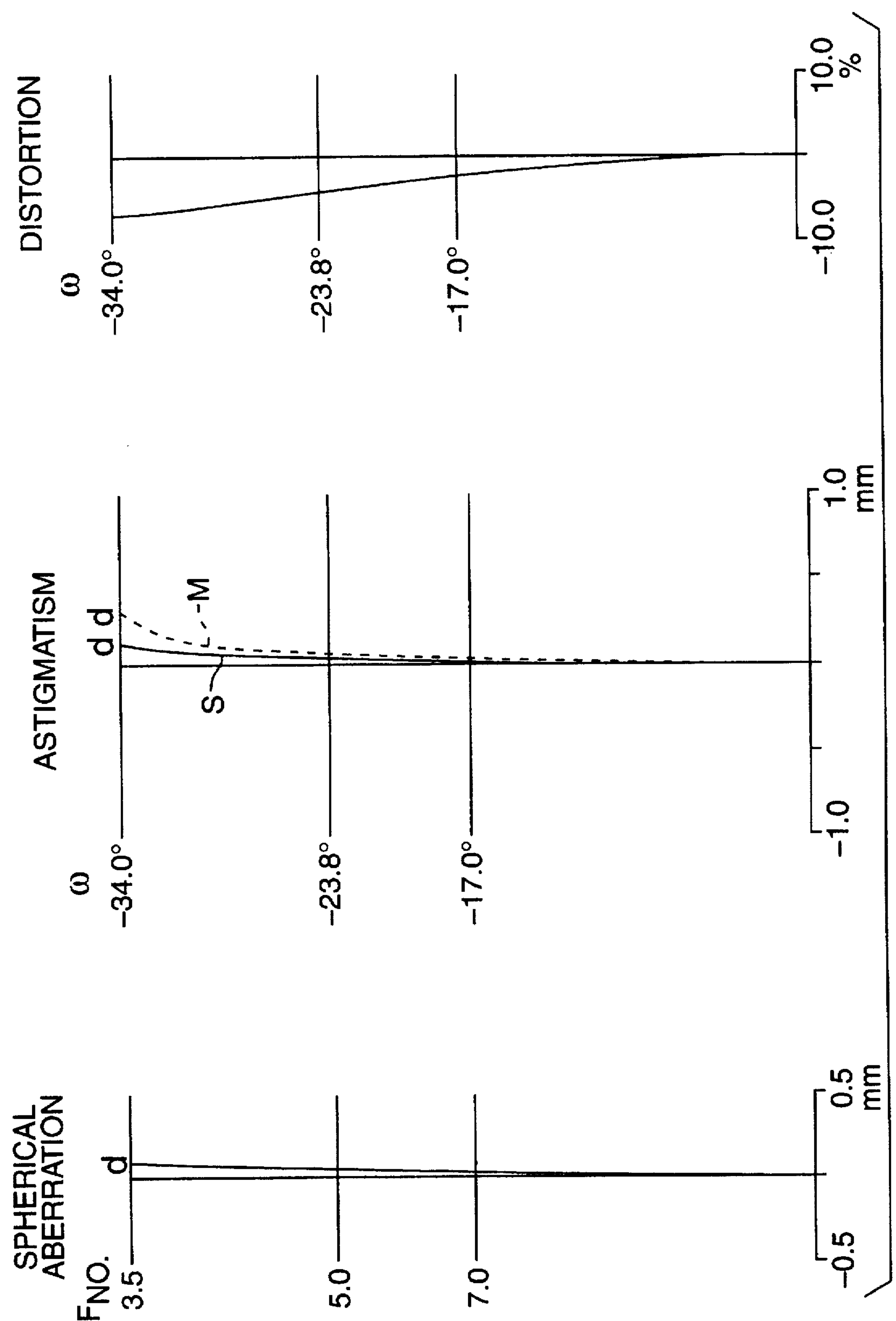
FIG. 12 shows plots for spherical aberration, astigmatism, and distortion exhibited by Example Embodiment 6.

General aspects of an eyepiece lens according to the present invention are shown in FIG. 1, in which the eyepiece lens comprises, in order from the objective lens side on an optical axis A, a first lens group $G_1$ having an overall negative refractive power, a field stop FS, and second lens group $G_2$ having an overall positive refractive power. The first lens group $G_1$ and the second lens group $G_2$ are separated from each other by an axial air-space distance D. The first lens group $G_1$ comprises a cemented negative lens including two lens elements L11, L12 cemented together. The second lens group $G_2$ comprises a positive meniscus lens element $G_{21}$, a cemented lens $G_{22}$, and a lens subgroup $G_{23}$. The positive meniscus lens element $G_{21}$ has a concave surface $R_{21a}$ oriented objectivewise. The cemented lens $G_{22}$ includes two lens elements L221, L222 cemented together. The most objectivewise surface $R_{22a}$ of the cemented lens $G_{22}$ is a concave surface oriented objectivewise. The lens subgroup $G_{23}$ has a positive refractive power and comprises a positive meniscus lens element L232 having a concave surface $R_{232b}$ oriented eyewise.

An eyepiece lens according to the present invention preferably satisfies the following Conditional Expressions:

$$-4.5 \leq F_1/F \leq -2.0 \quad (1)$$

$$1.0 < F_2/F \leq 3.0 \quad (2)$$

$$2.5 \leq D/F \leq 5.0 \quad (3)$$

wherein F, $F_1$, and $F_2$ are the respective focal lengths of the eyepiece lens overall, the first lens group $G_1$, and the second lens group $G_2$; and D is the axial air-space distance between the first lens group $G_1$ and the second lens group $G_2$.

With the eyepiece lens of FIG. 1, a long eye relief could be obtained even if the surface $R_{22a}$ is an objectivewise-oriented planar or convex surface rather than a concave surface. However, if the surface $R_{22a}$ were planar or convex, then the focal length of the second lens group $G_2$ would have to be long to obtain long eye relief; this would cause the axial air-space distance D and the overall axial length of the eyepiece lens to be excessively long. Thus, it is preferred that the surface $R_{22a}$ be concave and oriented objectivewise.

In an eyepiece lens according to the present invention, the surface $R_{22a}$ is concave toward the objective lens side. As a result, the rear principal point of the second lens group $G_2$ is shifted eyewise. Consequently, it is possible to obtain a sufficiently long eye relief without making the focal length of the second lens group $G_2$ longer, and to keep the overall length of the eyepiece lens short by decreasing the axial air-space distance D.

With respect to Conditional Expression (1), if $F_1/F$ were to fall below the lower limit, then the negative refractive power of the first lens group $G_1$ would be excessively weakened, thereby increasing the Petzval's sum of the eyepiece lens and making it difficult to effectively correct image curvature. If the upper limit of Conditional Expression (1) were to be exceeded, then the negative refractive power of the first lens group $G_1$ would be too strong; this would invite an excessive increase in the diameter of the second lens group $G_2$, thereby making it difficult to effectively correct astigmatism and distortion. Exceeding the upper limit of Conditional Expression (1) would be undesirable also because the pupil magnification of the second lens group $G_2$ would be too great, thereby increasing the difficulty of correcting pupil aberration.

To achieve better performance, the eyepiece lens more preferably satisfies Conditional Expression (1) having limits as follows:

$$-4.0 \leq F_1/F \leq -2.0$$

For even better performance, the eyepiece lens most preferably satisfies Conditional Expression (1) having limits as follows:

$$-3.5 \leq F_1/F \leq -2.0$$

With respect to Conditional Expression (3), if D/F were to fall below the lower limit, then the axial air-space distance D would be so small that the lens surfaces of both of the lens groups $G_1$, $G_2$ would be too close to the image plane of the eyepiece lens; this would create practical problems wherein debris and flaws on the lens surfaces would become more visible to the user. If the upper limit of Conditional Expression (3) were to be exceeded, then the overall length of the eyepiece lens system would be too long; this would be impractical because the eyepiece lens would lose compactness. This would also invite increases in the diameter of the second lens group $G_2$, making it difficult to effectively correct the various aberrations.

To achieve better performance, the eyepiece lens more preferably satisfies Conditional Expression (3) having the following limits:

$$2.5 \leq D/F \leq 4.5$$

For even better performance, the eyepiece lens most preferably satisfies Conditional Expression (3) having limits as follows:

$$2.8 \leq D/F \leq 4.0$$

With respect to Conditional Expression (2), if $F_2/F$ were to fall below the lower limit, then the focal length $F_2$ would be smaller than the focal length F; this would excessively increase the difficulty of obtaining an eye relief that is at least 100% of the focal length F. If the upper limit of Conditional Expression (2) were to be exceeded, then the eyepiece lens would be rendered incapable of satisfying either one or both of Conditional Expression (1) and Conditional Expression (3); this would undesirably cause various problems, such as increasing the difficulty of correcting aberrations and increasing the overall axial length of the eyepiece lens.

To achieve better performance, the eyepiece lens more preferably satisfies Conditional Expression (2) having the following limits:

$$1.5 \leq F_2/F \leq 3.0$$

It is also preferable that an eyepiece lens according to the present invention fulfill the following Conditional Expression (4):

$$-0.3 \leq F/R_{22a} < 0 \quad (4)$$

wherein $R_{22a}$ is the curvature radius of the most objectivewise lens surface of the cemented lens $G_{22}$ in the second lens group $G_2$. If $F/R_{22a}$ were to fall below the lower limit of Conditional Expression (4), then the negative refractive power of the lens surface $R_{22a}$ would be too great. This would require that the positive refractive power of the lens elements situated eyewise of the cemented lens $G_{22}$ be excessively increased. This would invite an excessive increase in the diameter of such eyewise lens elements. As a result, it would be difficult to correct aberrations such as astigmatism, coma and distortion at the periphery of the field of view. If the upper limit of Conditional Expression (4) were to be exceeded, then the lens surface $R_{22a}$ would be planar or convex toward the objective lens side, thereby necessitating an increase in lens diameter and overall length of the eyepiece lens in order to obtain a satisfactorily long eye relief.

To achieve better correction of aberrations while ensuring a satisfactory eye relief, the eyepiece lens more preferably satisfies Conditional Expression (4) having the following limits:

$$-0.25 \leq F/R_{22a} \leq -0.01$$

For even better performance, the eyepiece lens most preferably satisfies Conditional Expression (4) having limits as follows:

$$-0.2 \leq F/R_{22a} \leq -0.015$$

Further with respect to an eyepiece lens according to the present invention, it is preferred that the lens subgroup $G_{23}$ consist of two lens elements L231, L232. At least one of the lens elements in the lens subgroup $G_{23}$ is a positive meniscus lens element (e.g., lens element L232 in FIG. 1) having a concave surface (e.g., $R_{232b}$ in FIG. 1) oriented eyewise. Such a configuration is favorable for effectively correcting various aberrations such as astigmatism, coma, and distortion, across a wide field of view.

EXAMPLE EMBODIMENTS OF THE INVENTION

FIGS. 1, 3, 5, 7, 9, and 11 depict specific optical configurations according to Example Embodiments 1–6, respectively. Each Example Embodiment comprises, in order from the objective lens side, a first lens group $G_1$ having a negative refractive power, and a second lens group $G_2$ having a positive refractive power. A field stop FS is axially situated between the first lens group $G_1$ and the second lens group $G_2$.

In Example Embodiments 1–3 (FIGS. 1, 3, and 5, respectively), the first lens group $G_1$ comprises a cemented negative lens including two lens elements L11, L12 cemented together. The second lens group $G_2$ comprises, in order from the objective lens side, a positive meniscus lens element $G_{21}$ having a concave surface $R_{21a}$ oriented objectivewise; a cemented lens $G_{22}$ including two lens elements L221, L222 cemented together, and having a most objectivewise lens surface that is a concave surface oriented objectivewise; and a lens subgroup $G_{23}$ having a positive refractive power and comprising a positive lens element L231 and a meniscus lens element L232, wherein the meniscus lens element has a concave surface oriented eyewise.

In Example Embodiments 4–6 (FIGS. 7, 9, and 11, respectively), the first lens group $G_1$ comprises a meniscus lens L13 and a cemented lens including two lens elements L11, L12 cemented together. The second lens group $G_2$ comprises, in order from the objective lens side, a positive meniscus lens element $G_{21}$ having a concave surface $R_{21a}$ oriented objectivewise; a cemented lens $G_{22}$ including two lens elements L221, L222 cemented together and having a most objectivewise lens surface that is concave and oriented toward the objective lens side; and a lens subgroup $G_{23}$ having a positive refractive power and comprising two positive meniscus lens elements L231, L232 each having a concave surface oriented eyewise.

Specifications for Example Embodiments 1–6 are set forth in Tables 1–6, respectively. In the Tables, the first column sequentially lists the lens surfaces in order from the objective lens side as shown in FIGS. 1, 3, 5, 7, 9, and 11, respectively. In the second column r denotes the curvature radius of the corresponding lens surface. In the third column d denotes the axial interfacial distance between corresponding adjacent lens surfaces. In the fourth column $n_d$ denotes the refractive index (d-line; $\lambda$=587.6 nm) of the respective lens element. In the fifth column $\nu_d$ represents the Abbe number (relative to d-line) for the corresponding lens element. The sixth column conveniently provides the lens group in which the corresponding lens element is situated.

Table 7 also provides, for each corresponding Example Embodiment, the overall focal length F of the eyepiece lens, the focal length $F_1$ of the first lens group $G_1$, the focal length $F_2$ of the second lens group $G_2$, the eye relief (in mm and as a percent of the overall focal length F). Values of Conditional Expressions (1)–(4) for each Example Embodiment (1)–(6) are also set forth in Table 7.

TABLE 1

| Surface No. | r (mm) | d (mm) | $n_d$ | $\nu_d$ | Lens Group |
|---|---|---|---|---|---|
| 1 | −81.40 | 1.5 | 1.58913 | 61.09 | $G_1$ |
| 2 | 15.71 | 3.0 | 1.80458 | 25.50 | $G_1$ |
| 3 | 22.99 | 34.10 | | | |
| 4 | −180.00 | 5.0 | 1.62041 | 60.14 | $G_{21}$ |
| 5 | −29.50 | 0.2 | | | |
| 6 ($R_{22a}$) | −52.88 | 1.5 | 1.80458 | 25.50 | $G_{22}$ |
| 7 | 28.92 | 10.0 | 1.58913 | 61.09 | $G_{22}$ |
| 8 | −30.26 | 0.2 | | | |
| 9 | 44.00 | 5.0 | 1.62041 | 60.14 | $G_{23}$ |
| 10 | −106.43 | 0.2 | | | |

TABLE 1-continued

| Surface No. | r (mm) | d (mm) | $n_d$ | $\nu_d$ | Lens Group |
|---|---|---|---|---|---|
| 11 | 22.06 | 4.5 | 1.58913 | 61.09 | $G_{23}$ |
| 12 | 70.00 | | | | |

TABLE 2

| Surface No. | r (mm) | d (mm) | $n_d$ | $\nu_d$ | Lens Group |
|---|---|---|---|---|---|
| 1 | −70.00 | 1.5 | 1.58913 | 61.09 | $G_1$ |
| 2 | 15.71 | 3.0 | 1.80458 | 25.50 | $G_1$ |
| 3 | 23.85 | 34.31 | | | |
| 4 | −180.00 | 5.0 | 1.62041 | 60.14 | $G_{21}$ |
| 5 | −29.50 | 0.2 | | | |
| 6 ($R_{22a}$) | −80.42 | 1.5 | 1.80458 | 25.50 | $G_{22}$ |
| 7 | 25.69 | 10.0 | 1.58913 | 61.09 | $G_{22}$ |
| 8 | −36.10 | 0.2 | | | |
| 9 | 43.98 | 5.0 | 1.62041 | 60.14 | $G_{23}$ |
| 10 | −106.42 | 0.2 | | | |
| 11 | 21.60 | 5.0 | 1.58913 | 61.09 | $G_{23}$ |
| 12 | 70.00 | | | | |

TABLE 3

| Surface No. | r (mm) | d (mm) | $n_d$ | $\nu_d$ | Lens Group |
|---|---|---|---|---|---|
| 1 | −75.60 | 1.5 | 1.58913 | 61.09 | $G_1$ |
| 2 | 15.23 | 3.0 | 1.80458 | 25.50 | $G_1$ |
| 3 | 22.10 | 33.78 | | | |
| 4 | −200.00 | 5.0 | 1.62041 | 60.14 | $G_{21}$ |
| 5 | −29.22 | 0.2 | | | |
| 6 ($R_{22a}$) | −500.00 | 1.5 | 1.80458 | 25.50 | $G_{22}$ |
| 7 | 22.07 | 10.5 | 1.58913 | 61.09 | $G_{22}$ |
| 8 | −40.24 | 0.2 | | | |
| 9 | 28.26 | 5.5 | 1.62041 | 60.14 | $G_{23}$ |
| 10 | −287.85 | 0.2 | | | |
| 11 | 24.00 | 4.0 | 1.58913 | 61.09 | $G_{23}$ |
| 12 | 68.86 | | | | |

TABLE 4

| Surface No. | r (mm) | d (mm) | $n_d$ | $\nu_d$ | Lens Group |
|---|---|---|---|---|---|
| 1 | 14.40 | 3.0 | 1.51680 | 64.10 | $G_1$ |
| 2 | 7.77 | 3.2 | | | |
| 3 | −17.24 | 1.5 | 1.51680 | 64.10 | $G_1$ |
| 4 | 11.59 | 3.0 | 1.80458 | 25.50 | $G_1$ |
| 5 | 29.12 | 24.55 | | | |
| 6 ($R_{22a}$) | −50.00 | 5.5 | 1.65160 | 58.50 | $G_{21}$ |
| 7 | −20.10 | 0.2 | | | |
| 8 | −50.00 | 1.5 | 1.80458 | 25.50 | $G_{22}$ |
| 9 | 21.19 | 12.0 | 1.65160 | 58.50 | $G_{22}$ |
| 10 | −29.87 | 0.2 | | | |
| 11 | 31.34 | 5.0 | 1.62041 | 60.14 | $G_{23}$ |
| 12 | 436.98 | 0.2 | | | |
| 13 | 20.05 | 5.5 | 1.58913 | 61.09 | $G_{23}$ |
| 14 | 69.80 | | | | |

TABLE 5

| Surface No. | r (mm) | d (mm) | $n_d$ | $\nu_d$ | Lens Group |
|---|---|---|---|---|---|
| 1 | 13.43 | 3.0 | 1.51680 | 64.10 | $G_1$ |
| 2 | 7.92 | 3.0 | | | |
| 3 | −18.70 | 1.5 | 1.51680 | 64.10 | $G_1$ |
| 4 | 11.75 | 3.0 | 1.80458 | 25.50 | $G_1$ |
| 5 | 23.54 | 26.75 | | | |
| 6 ($R_{22a}$) | −50.00 | 5.0 | 1.65160 | 58.50 | $G_{21}$ |
| 7 | −20.64 | 0.2 | | | |
| 8 | −110.00 | 1.5 | 1.80458 | 25.50 | $G_{22}$ |
| 9 | 19.60 | 11.0 | 1.65160 | 58.50 | $G_{22}$ |
| 10 | −35.50 | 0.2 | | | |
| 11 | 27.60 | 4.5 | 1.62041 | 60.14 | $G_{23}$ |
| 12 | 112.86 | 0.2 | | | |
| 13 | 19.60 | 5.5 | 1.58913 | 61.09 | $G_{23}$ |
| 14 | 70.00 | | | | |

TABLE 6

| Surface No. | r (mm) | d (mm) | $n_d$ | $\nu_d$ | Lens Group |
|---|---|---|---|---|---|
| 1 | 13.43 | 3.0 | 1.51680 | 64.10 | $G_1$ |
| 2 | 7.64 | 3.2 | | | |
| 3 | −18.74 | 1.5 | 1.51680 | 64.10 | $G_1$ |
| 4 | 11.44 | 3.0 | 1.80458 | 25.50 | $G_1$ |
| 5 | 24.83 | 26.21 | | | |
| 6 ($R_{22a}$) | −50.25 | 5.0 | 1.65160 | 58.50 | $G_{21}$ |
| 7 | −20.56 | 0.2 | | | |
| 8 | −400.00 | 1.5 | 1.80458 | 25.50 | $G_{22}$ |
| 9 | 18.34 | 11.5 | 1.62041 | 60.14 | $G_{22}$ |
| 10 | −40.83 | 0.2 | | | |
| 11 | 26.14 | 5.0 | 1.62041 | 60.14 | $G_{23}$ |
| 12 | 141.69 | 0.2 | | | |
| 13 | 19.99 | 5.5 | 1.58913 | 61.09 | $G_{23}$ |
| 14 | 70.00 | | | | |

TABLE 7

| | Example Embodiment | | | | | |
|---|---|---|---|---|---|---|
| Parameter | 1 | 2 | 3 | 4 | 5 | 6 |
| F (mm) | 10.50 | 10.50 | 10.50 | 7.00 | 7.00 | 7.00 |
| $F_1$ (mm) | −35.36 | −35.36 | −33.53 | −16.50 | −16.50 | −16.50 |
| $F_2$ (mm) | 18.60 | 18.60 | 18.60 | 16.50 | 16.50 | 16.50 |
| Eye Relief (ER) (mm) | 18.35 | 17.80 | 17.32 | 17.72 | 17.02 | 16.75 |
| ER as % of F | 174.8 | 169.5 | 165.0 | 253.1 | 243.1 | 239.3 |
| (1) $F_1/F$ | −3.37 | −3.37 | −3.19 | −2.36 | −2.36 | −2.36 |
| (2) $F_2/F$ | 1.77 | 1.77 | 1.77 | 2.36 | 2.36 | 2.36 |
| (3) D/F | 3.25 | 3.27 | 3.22 | 3.51 | 3.82 | 3.74 |
| (4) $F/R_{22a}$ | −0.20 | −0.13 | −0.02 | −0.14 | −0.06 | −0.018 |

FIGS. 2, 4, 6, 8, 10, and 12 provide plots of spherical aberration, astigmatism, and distortion for each of Example Embodiments 1–6, respectively. Each plot corresponds to image-formation aberration when light rays enter the eye-piece lens from the eye side. In the astigmatism plots, the dashed line M represents the meridional image surface and the solid line S represents the sagittal image surface. In the spherical aberration plots, $F_{NO}$ denotes the F number. In the astigmatism and distortion plots, ω represents half the apparent field of view.

As is clear from Table 7 and the various aberration plots, aberrations are effectively corrected in eyepiece lenses according to the present invention. Moreover, each Example Embodiment exhibits a sufficiently long eye relief of greater than 150% of F.

Thus, the present invention provides compact eyepiece lenses in which the various aberrations are effectively corrected across a wide field of view, even though the eyepiece lenses have short focal lengths. Furthermore, eye relief is generous, ranging from over 100% to over 150% of the overall focal length of the eyepiece lens, while not necessitating an excessive increase in the axial length of the eyepiece lenses.

The present invention has been described in connection with preferred embodiments and various Example Embodiments. Thus, the invention will be understood not to be limited to those embodiments or examples. On the contrary, the invention is intended to cover all alternatives, modifications, and equivalents as may be included within the spirit and scope of the invention as defined by the appended claims.

What is claimed is:

1. An eyepiece lens, comprising, in order from the objective lens side:

(a) a first lens group $G_1$ having a negative refractive power and a focal length F1, a second lens group $G_2$ having a positive refractive power and a focal length F2, and a field stop situated between the first and second lens groups, the first and second lens groups being separated from each other by an axial air-space distance D;

(b) the first lens group $G_1$ comprising a cemented negative lens including two lens elements cemented together;

(c) the second lens group $G_2$ comprising, in order from the objective lens side, a positive meniscus lens element $G_{21}$ having a concave surface oriented objectivewise; a cemented lens $G_{22}$ comprising two lens elements cemented together and having a most objectivewise lens surface that is a concave surface oriented objectivewise; and a lens subgroup $G_{23}$ having a positive refractive power and comprising a positive meniscus lens element having a concave surface oriented eyewise; and (d) the eyepiece lens satisfying the following Conditional Expressions:

$$-4.5 \leqq F_1/F \leqq -2.0$$

$$1.0 < F_2/F \leqq 3.0$$

$$2.5 \leqq D/F \leqq 5.0$$

wherein F is the overall focal length of the eyepiece lens.

2. The eyepiece lens of claim 1, further satisfying the Conditional Expression:

$$-0.3 \leqq F/R_{22a} < 0$$

wherein $R_{22a}$ is the curvature radius of a lens surface closest to the objective lens side in the cemented lens $G_{22}$ of the second lens group $G_2$.

3. The eyepiece lens of claim 1, wherein the lens subgroup $G_{23}$ of the second lens group $G_2$ comprises at least a first lens element and a second lens element, at least one of which lens elements being a positive meniscus lens element having a concave surface oriented eyewise.

4. The eyepiece lens of claim 2, wherein the lens subgroup $G_{23}$ of the second lens group $G_2$ comprises at least a first lens element and a second lens element, at least one of which lens elements being a positive meniscus lens element having a concave surface oriented eyewise.

5. The eyepiece lens of claim 1, further satisfying at least one of the following Conditional Expressions:

$$-4.0 \leqq F_1/F \leqq -2.0$$

$$-3.5 \leqq F_1/F \leqq -2.0$$

$$1.5 < F_2/F \leqq 3.0$$

$$2.5 \leqq D/F \leqq 4.5$$

$$2.8 \leqq D/F \leqq 4.0$$

$$-0.25 \leqq F/R_{22a} < -0.01$$

$$-0.2 \leqq F/R_{22a} < -0.015$$

6. The eyepiece lens of claim 1, exhibiting an eye relief of at least 100 percent of F.

7. The eyepiece lens of claim 6, exhibiting an eye relief of at least 150 percent of F.

8. The eyepiece lens of claim 7, exhibiting an eye relief of at least 200 percent of F.

9. The eyepiece lens of claim 1, exhibiting an eye relief of at least 150 percent of F.

10. The eyepiece lens of claim 1, exhibiting an eye relief of at least 200 percent of F.

* * * * *